United States Patent Office 3,136,000
Patented June 9, 1964

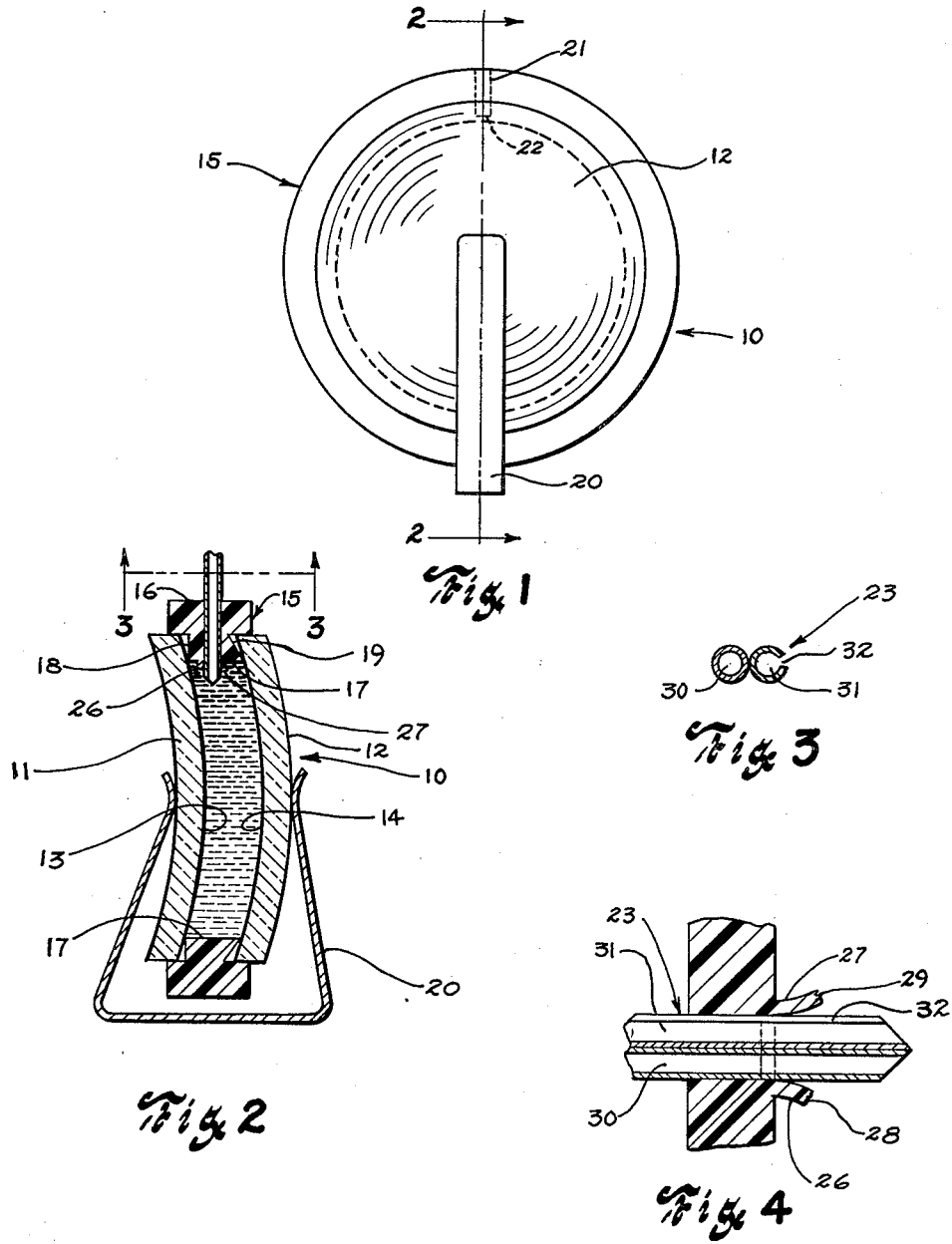

3,136,000
MOLD FOR PRODUCING LENSES AND LENS
BLANKS FROM POLYMERIZABLE MATERIALS
Chester M. Slyk, Auburn, Mass., assignor to American
Optical Company, Southbridge, Mass., a voluntary
association of Massachusetts
Filed Oct. 18, 1962, Ser. No. 231,384
5 Claims. (Cl. 18—39)

This invention relates to molding devices and has particular reference to an improved mold for producing optical elements from polymerizable resinous materials.

In the art of producing optical elements such as lenses or blanks for lenses of resinous materials, it has been the usual practice to cast the resinous material in a mold comprisng a pair of glass mold halves of controlled surface shapes coupled together about their contour edges by an annular plastic gasket to form a closed mold cavity. The mold cavity was filled with a liquid polymerizable synthetic resin monomer which was thereafter caused to be cured and solidified to the shape of the mold cavity by heat while held in said mold.

Molds of the above nature, when forming ophthalmic lenses or blanks for such lenses, require the use of many different combinations of glass mold halves, that is, mold halves having an assortment of curved surfaces which may be combined to cover the full range of differently required prescriptive values.

Great difficulty has been encountered, in the past, in providing suitable means for properly supporting such mold halves so as to, in all instances, produce a positively sealed mold cavity.

For certain of the prior art techniques of this nature, attention is directed to J. O. Beattie Patent No. 2,542,386, and J. W. Weinberg Patent No. 3,056,166. The gaskets shown and described in the above-mentioned patents have all proven deficient either in that they failed to properly confine the liquid polymerizable synthetic resin monomer within the limits of the mold cavity for all differently shaped mold halves, required separate gaskets for each respective mold assembly or required special treatment of the mold halves and gasket in an attempt to obtain universally usable gaskets and mold halves.

Another problem with such assemblies was that a portion of the gasket had to be pulled or displaced away from the mold halves sufficiently to permit introduction of the liquid monomer into the mold cavity and, in many instances, permitted foreign matter to gain access to the cavity or brought about improper association of the mold halves.

The present invention, therefore, has a primary object thereof the provision of a universally usable gasket which, particularly with spherically curved mold halves, will insure a positive seal with said halves regardless of the related surface curvatures thereof and without requiring special treatment of said mold halves.

Another object is to provide a gasket having an annular portion adapted for use with circularly contoured mold halves, one having a convex side surface and the other a concave surface facing said convex surface, said annular portion being adapted to encircle and hold the mold halves in assembled relation and further having an internal lip formed with spaced side surfaces adapted to extend between and engage the convex and concave surfaces, the side surface which engages the concave surface being formed at an acute angle relative to the adjacent inner surface of the annular portion so that the apex of the angle will have effective line contact with said concave surface, the said angle being such that line contact will take place with any of the concave surfaces falling within the range required for producing different corrective prescriptive spherical lenses and the other spaced side surface also being such as to have effective line contact with the convex surface of the other of said mold halves throughout the range of convex surfaces required for different corrective prescriptive lenses, said side surfaces being spaced by an amount sufficient to produce the desired thickness of the resultant lens element.

Another object is to provide the gasket with novel means through which the mold cavity may be filled with liquid polymerizable synthetic resin monomer and which, subsequent to said filling, is self-sealing to retain the monomer therein and to prevent spilling during subsequent handling of the filled mold.

A specific embodiment of the invention will now be described by way of example with reference to the accompanying drawings in which:

FIG. 1 is a top plan view of the mold embodying the invention;

FIG. 2 is a sectional view taken as on line 2—2 of FIG. 1 and looking in the direction indicated by the arrows;

FIG. 3 is an enlarged sectional view taken as on line 3—3 of FIG. 2 and looking in the direction indicated by the arrows; and FIG. 4 is an enlarged sectional view diagrammatically illustrating how the monomer is directed into the mold.

Referring to FIGURES 1 and 2, the molding device 10 of the invention comprises a pair of mold halves preferably in the form of disc-like members of glass 11 and 12 having circular contour edges, one having an optically finished convex surface 13 and the other an optically finished concave surface 14, the pair of mold halves are selected from a group having different surface curvatures and which may be combined to meet all of the prescriptive requirements in the ophthalmic lens field, that is, when complete lenses are being cast. However, lens blanks having a pre-controlled base curve may be cast through the use of similar mold halves. In this instance a single cast blank having a given base curve may be used to produce several different prescriptive lenses by placing the required prescriptive curve on the side of the blank opposite the cast base curve surface. This prescriptive surface may be formed by conventional curve generating and polishing means.

The mold halves 11 and 12 are supported in spaced assembled relation with each other by a gasket 15 which embodies the essence of the present invention. The gasket 15 is preferably formed of a resinous material such as polyvinyl chloride which contains a plasticizer such as tri-cresyl phosphate or dioctyl phthalate and to which may be added a stabilizer such as barium or cadmium and an oil such as soybean oil may also be added to produce a gasket having desired flexibility. Increased flexibility may be obtained by adding more plasticizer and vice versa.

The above is given only by way of illustration as it forms no direct part of the present invention other than to provide a gasket which is flexible and which, when portions thereof are displaced or distorted, will tend to return to their initial set or shape. The annular portion 16 is controlled in size so as to receive and to relatively intimately fit with the contour of the selected mold halves 11 and 12. Said annular portion is provided internally thereof with a spacer lip 17 which has opposed side surfaces 18 and 19 which are adapted to extend between and engage the inner surfaces 13 and 14 respectively of the mold halves and is controlled as to its width so as to space said mold halves a required amount in order to obtain the thickness desired of the ultimate finished cast lens or blank.

One of the novel features of the present invention over known prior art gaskets of this nature resides in the forming of the side surface 19 of lip 17 to such an acute angle relative to the adjacent inner surface of the annular portion 16 as to have yielding effective line contact with the concave surfaces of the mold halves 12 throughout the full range of concave surfaces required for producing lenses of different prescriptive powers and the other of said side surfaces 18 being such as to have yielding effective line contact with the convex surface 13 of the other of said mold halves throughout the range of convex surfaces required to obtain said prescriptive powers. This latter effect is obtained by forming said surface 18 substantially normal to the axis of the mold.

With applicant's gasket, effective line contact is obtained with both of the concave and covex surfaces of the mold halves throughout the full range of such surfaces which are required in order to obtain the full range of prescriptive values desired. Such line contact, because of the inherent flexibility of the material of the gasket 15, insures a positive seal along said lines of contact when the mold halves are held in clamping relation with said lip 17 by a spring clamp member or the like 20.

The gasket 15, as shown in FIGS. 1, 2 and 4, initially has an opening 21 formed in a side wall thereof and which terminates in a relatively thin solid web 22, as shown primarily in FIG. 1.

In casting a lens or lens blank, a dual-channelled needle 23, such as shown in FIGS. 2, 3 and 4, is pierced through the web 22 to gain access to the cavity of the mold. During insertion of the needle, the web 22 is pierced so as to provide inwardly deflected portions 26 and 27 having relatively roughly torn ends 28 and 29, see FIG. 4. The liquid polymerizable synthetic resin monomer from which the lens is to be cast is inserted through one of the channels 30 of the needle 23 while air is permitted to be exhausted from the mold cavity through the other of said channels 31 of said needle and which has a slotted wall 32 extending longitudinally throughout the length thereof.

When the mold cavity is filled, the needle 23 is withdrawn and the inwardly deflected portions 26 and 27, due to their tendency to return to their initial set or shape and aided by the friction drag of the needle, will cause said portions to move outwardly to allow the torn ends 28 and 29 thereof to meet in overlying sealed relation with each other to thereby produce a self-sealing action.

The assembly is then subjected to heat for curing and solidifying the monomer starting at room temperature to approximately 195° F. throughout a time cycle of from about 11 to 15 hours.

The details of the heat treatment form no part of the present invention nor does the particular resinous composition from which the lens is made. For completeness of description, however, the following composition is one suitable for use in casting lenses:

A polymerizable composition comprising monomeric diethylene glycol bis (allyl carbonate) and monomeric ethylene glycol maleate and a polymerization catalyst therefor, the composition containing not less than 7.5% and not more than 20% ethylene glycol maleate, the catalyst being an organic peroxy-carbonate in an amount of at least 5.25%.

It is to be understood that any other suitable polymerizable material may be used and that the gasket composition must be such that the plasticizer used in forming said gasket will not migrate into the polymerizable monomer during the casting of the lens. The above compositions given in connection with the forming of the gaskets are of this nature.

From the foregoing, it will be seen that simple, efficient and economical means have been provided for accomplishing all of the objects and advantages of the invention.

Having described my invention, I claim:

1. In a molding device for forming a plastic optical element comprising one mold half having an optically curved convex surface adapted to mold the concave surface of the element and a second mold half having an optically curved concave surface adapted to mold the convex surface of said element, the improvement which comprises a gasket having an annular portion positioned in encircling relation with the periphery of said mold halves to hold said mold halves in assembled relation and having an internal lip fitting between and engaging the respective concave and convex surfaces of said mold halves, the portion of the lip engaging the mold half having the concave surface being so angled as to have effective line contact with said surface and the portion of the lip engaging the convex surface being so shaped as to have effective line contact with said surface and means for retaining said respective mold halves in said effective line contact with the respective portions of the lip.

2. In a molding device for forming a plastic optical element comprising one mold half having an optically curved convex surface adapted to mold the concave surface of the element and a second mold half having an optically curved concave surface adapted to mold the convex surface of said element, the improvement which comprises a gasket having an annular portion adapted to be positioned in encircling relation with the periphery of said mold halves to hold said mold halves in assembled relation and having an internal lip adapted to be fitted between and in engaging relation with the respective concave and convex surfaces of said mold halves, the portion of the lip for engaging the mold half having the concave surface being so angled as to have effective line contact with said surface and the portion of the lip for engaging the convex surface being so shaped as to have effective line contact with said surface, said annular portion and inner lip having an opening extending therein and terminating in a relatively thin solid web.

3. In a molding device for forming a plastic optical element comprising one mold half having an optically curved convex surface adapted to mold the concave surface of the element and a second mold half having an optically curved concave surface adapted to mold the convex surface of said element, the improvement which comprises a gasket having an annular portion positioned in encircling relation with the periphery of said mold halves to hold said mold halves in assembled relation and having an internal lip fitting between and engaging the respective concave and convex surfaces of said mold halves, the portion of the lip engaging the mold half having the concave surface being so angled as to have effective line contact with said surface and the portion of the lip engaging the convex surface being so shaped as to have effective line contact with said surface and means for clamping said mold halves within said annular portion.

4. In a molding device for forming a plastic optical element comprising one mold half having an optically curved convex surface adapted to mold the concave surface of the element and a second mold half having an optically curved concave surface adapted to mold the convex surface of said element, the improvement which comprises a gasket having an annular portion positioned in encircling relation with the periphery of said mold halves to hold said mold halves in assembled relation and having an internal lip fitting between and engaging the respective concave and convex surfaces of said mold halves, the portion of the lip engaging the mold half having the concave surface being so angled as to have effective line contact with said surface and the portion of the lip engaging the convex surface being so shaped as to have effective line contact with said surface, said annular portion and inner lip having an opening extending therein and terminating in a relatively thin solid web and means for clamping said mold halves within said annular portion.

5. A gasket for use in forming a molding device for producing plastic optical elements comprising an annular portion of flexible plastic material having an internal lip with spaced side surfaces, one of which is disposed at an acute angle with respect to the inner surface of said annular portion and the other being disposed in substantially normal relation with said inner surface of said annular portion.

References Cited in the file of this patent

UNITED STATES PATENTS

| | | |
|---|---|---|
| 2,503,147 | Applezweig | Apr. 4, 1950 |
| 3,056,166 | Weinberg | Oct. 2, 1962 |
| 3,070,846 | Schrier | Jan. 1, 1963 |